United States Patent Office 3,468,947
Patented Sept. 23, 1969

3,468,947
PREPARATION OF ALPHA,BETA-UNSATURATED ACYL HALIDES
John A. Scheben, Erlanger, Ky., and Irving L. Mador, Cincinnati, Ohio, assignors to National Distillers and Chemical Corporation, New York, N.Y., a corporation of Virginia
No Drawing. Filed Sept. 2, 1965, Ser. No. 484,715
Int. Cl. C07c *51/58, 57/06*
U.S. Cl. 260—544        14 Claims

ABSTRACT OF THE DISCLOSURE

The preparation of alpha,beta-unsaturated acyl halides by reacting olefins with carbon monoxide in the presence of a platinum or palladium triad catalyst, a halide and an acid acceptor. In one example, acrylyl chloride is prepared by reacting ethylene with carbon monoxide in the presence of palladous chloride, cupric chloride and acetonitrile.

---

This invention relates to a process for preparing alpha, beta-unsaturated acyl halides from olefins by reaction with carbon monoxide in the presence of a platinum or palladium triad catalyst, and more particularly to the preparation of acrylyl chlorides by reaction of ethylene or styrene with carbon monoxide in the presence of palladous chloride.

Blackham, U.S. Patent No. 3,119,861, isssued Jan. 28, 1964, describes a process for the preparation of beta-halo acyl halides by reaction of carbon monoxide with an olefinic hydrocarbon-palladium halide complex in the presence of a liquid reaction medium inert with respect to acyl halides. Thus, by this process, beta-chloropropionyl chloride is prepared from reaction of carbon monoxide with an ethylene-palladium chloride complex, beta-chlorobutyryl chloride from carbon monoxide and a propylene-palladium chloride complex, and the like. Preferably, the palladium halide complex is preformed prior to reaction with the carbon monoxide, but if desired the complex can be formed in situ while in contact with the carbon monoxide, in which case palladium halide and olefin, carbon monoxide, and a liquid reaction medium inert to acyl halide comprise the reaction mixture.

The reaction thus proceeds according to the following equation, using ethylene and palladous chloride as illustrative:

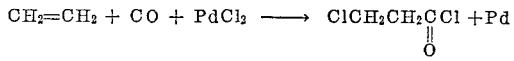

The reaction is carried out under a wide range of temperatures, from room temperature to 110° C. and higher. Blackham does not postulate any reaction mechanism, and at the time the patent issued it was still unclear by what reaction mechanism this reaction could take place; however, the halogen taken up by the olefin in forming the acyl halide is provided via the palladous halide.

In accordance with the instant invention, it has been found that if the reaction described by Blackham of a palladous halide, an olefin, and carbon monoxide is carried out in the presence of an acid acceptor in an amount sufficient to accept one mole of halogen per mole of palladous halide, then one obtains not the beta-halo acyl halide, but the alpha, beta-unsaturated acyl halide. The reaction is shown in the following scheme, using ethylene and palladous chloride as illustrative:

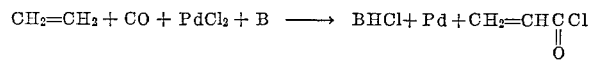

In the above scheme, B refers to the acid acceptor, and it will be seen that the acid acceptor accepts one mole of hydrogen chloride for each mole of olefin and each mole of palladous chloride reacted.

The obtention of an alpha, beta-unsaturated acyl halide using the Blackham process is quite surprising. The obtention of this product suggests, however, that the alpha, beta-unsaturated acyl halide may well be an intermediate which is not isolable under the Blackham process conditions. The addition of the acid acceptor in the amount stated may arrest the reaction at the intermediate stage. This is of course only a hypothesis, which has not been proved by corroboratory evidence. If, however, the Blackham reaction proceeded by the following intermediate mechanism, this could explain the function of the acid acceptor:

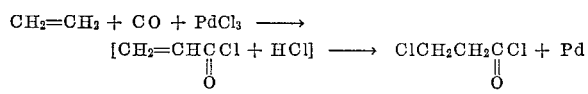

The function of the acid acceptor then is to take up the mole of hydrogen chloride liberated per mole of alpha, beta-unsaturated acyl halide formed and prevent this from reacting with the alpha, beta-unsaturated acyl halide to form the beta-halo acyl halide, its saturated derivative. This explanation is only postulated, and it will of course be understood that there is no assurance that it is the correct explanation.

The process of the invention is applicable to any olefin having the general formula

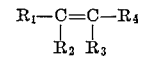

in which $R_1$, $R_2$, $R_3$, and $R_4$ represent hydrogen or organic radicals having from one to about thirty carbon atoms, such as, for instance, hydrocarbon radicals, for example, alkyl, aryl, cycloalkyl, alkylaryl, such as alkaryl and aralkyl, and alkenyl radicals. Any and all of the R radicals can be hydrogen, and mixtures of the various types of radicals can be present in any one compound. The compound can contain two or more olefinic groups, in which case the reaction takes place at each olefinic group. It is usually preferable, however, that one of the $R_1$, $R_2$, $R_3$, and $R_4$ groups, the one attached to the carbon at which the acyl halide group is to be added, be relatively small in size, so as to avoid thwarting the reaction by steric hindrance. Preferably, both of the R radicals attached to this carbon atom are hydrogen for optimum reactivity, as in the alpha-olefins.

Typical olefins include ethylene, propylene, alphabutylene, beta-butylene, alpha-amylene, alpha-hexylene, beta-octylene, alpha-decylene, alpha-dodecylene, styrene, 3-phenylpropene-1, cyclohexylethylene, 1,1,2-trimethylethylene, 2-methyl-alpha-butylene, 2-ethyl-alpha-butylene, neopentylene, isobutylene, isoamylene, and butadiene.

The acid acceptor can be any compound having an unshared electron pair or a negative ion capable of accepting a proton, capable of taking up or reacting with a hydrogen halide to form a product which is nonreactive with the alpha, beta-unsaturated acyl halide. Among the acid acceptors that can be used are the various organic aliphatic, cycloaliphatic and aromatic acid anhydrides, such as acetic anhydride, phthalic anhydride, succinic anhydride, propionic anhydride, maleic anhydride, adipic anhydride, malic anhydride, and butyric anhydride. Also useful are inorganic metal oxides and non-water-forming bases and basic salts, such as, for example, calcium oxide, barium oxide, sodium hydrogen phosphate, sodium acetate, sodium carbonate, sodium bicarbonate, sodium tartrate, dipotassium phthalate, sodium borate, calcium oxalate, and potassium hydrogen phosphate. The organic aliphatic and aromatic nitriles and iso-nitriles such as benzonitrile and acetonitrile react with anhydrous hydrogen halides to form imidohalides, and this reaction is irreversible.

The reaction can be carried out using any platinum or palladium triad metal catalyst, generically referred to in the claims as "platinum-palladium triad catalyst." The platinum-palladium metals include ruthenium, rhodium, osmium, iridium, platinum, and palladium, and these preferably are used in the form of the halide.

A halide catalyst furnishes the halide required for conversion of the olefin to the acyl halide; however, the catalyst need not serve as the source of halide, but can serve only as the vehicle to furnish halide to the olefin, some other compound serving as the halide source. For this purpose, metal halides that do not poison the platinum-palladium halide catalyst can be used, such as cupric halides and ferric halides, the halide being the halide desired in the acyl halide. Such metal halides are used in stoichiometric proportion with the olefin and serve to regenerate the active catalyst as the halide is consumed in the reaction, thus serving as a reservoir for halide.

In such cases, non-halide platinum or palladium triad catalysts can be used, such as the free metal or a compound of the metal, such as a salt, for instance, the nitrates, sulfates, or acetates; the oxides; or a complex of the metal with an organic compound, such as a benzonitrile complex, a bis-$\pi$-allyl complex, or a chelate such as acetyl acetonate. The catalyst free metal or compound of the metal can be supported on an inert carrier, such as carbon, alumina, or silica. The preferred catalysts are, however, the palladium halides, such as palladous chloride and palladous bromide, which are readily available, relatively inexpensive, and quite effective.

Other exemplary catalysts are palladium on carbon, palladous acetate, palladous benzoate, bis(benzonitrile) palladous chloride, and the chlorides of rhodium, ruthenium, platinum, iridium, and osmium, platinous acetate, rhodium oxide, palladous xyanide, rubidium carbonate, iridium chloride, potassium chloropalladite, and palladous acetyl acetonate.

Compounds known to complex with the platinum or palladium triad metal groups can also be added as co-catalysts. Examples of such ligands include triphenylphosphine, pyridine, benzonitrile, and pentane-1,3-dione. Small amounts of such co-catalysts suffice to give an improved effect. Amounts within the range from about 10 to about 500 mole percent based on the catalyst are usually adequate.

The reaction can be carried out by direct reaction of the olefin and carbon monoxide in the presence of the platinum or palladium triad catalyst. Alternatively, if desired, the platinum or palladium triad-olefin complex of Blackham can be formed by reaction of the olefin with the catalyst prior to reaction with the carbon monoxide. If the olefin is volatile, prereaction of the catalyst and olefin may be desirable, so as to bring the olefin into more intimate contact with the carbon monoxide in the active catalytic form.

This catalyst-olefin complex is formed at room temperature, but elevated temperatures up to about 125° C. can be employed, if desired. The gaseous olefin is added and reacted with the catalyst under pressure, desirably from about 1 to about 200 atmospheres, and reaction takes place with agitation over a period of from one-half to about ten hours. Thereafter, carbon monoxide is added, and the reaction then proceeds as described below.

In the case where the catalyst is formed in situ while in contact with the carbon monoxide, the platinum or palladium triad catalyst, olefin, and carbon monoxide are reacted together.

In either case, an inert organic solvent can be present so as to facilitate the reaction. If the olefin is a liquid, no solvent is really necessary, but a solvent aids in providing contact between the catalyst and olefin in the case of gaseous and solid olefins. The reaction mixture is preferably anhydrous, so that anhydrous solvents should be employed.

Any inert solvent which is nonreactive with acyl halides under the reaction conditions can be employed, such as, for example, aliphatic and aromatic hydrocarbons, such as mineral spirits, petroleum ether, benzene, toluene, xylene, nitrobenzene, naphthenes; ethers, phosphines and chlorinated aliphatic hydrocarbons, such as tetrahydrofuran, diethyl ether, dimethoxy ethane, n-butyl phosphine, and butyl chloride.

The reaction proceeds at moderate temperatures. The upper limit of temperature is normally established by the decomposition temperature of the reactants and reaction products. In general, the reaction will not be carried out at a temperature in excess of about 250° C. Good yields are obtained at temperatures from about 25° to about 150° C. in a reasonable reaction time, and this range is therefore preferred. At temperatures below about 20° C. the reaction rate may be unduly slow, but lower temperatures can be used if time is not important.

The amount of carbon monoxide is in no way critical. Sufficient carbon monoxide is required to react mole for mole with the olefin, but an excess is normally employed. Usually, pressures within the range from about 1 to about 300 atmospheres will be employed. Excellent results are obtained at pressures within the range from about 50 to about 150 atmospheres, and accordingly this range is preferred.

The amount of catalyst that can be employed is surprisingly small when a metal salt capable of reoxidizing the palladium-platinum triad catalyst is present. The catalyst is regenerated in the reaction mixture to form the starting material by reaction of the catalyst metal with the metal halide oxidizing agent. Thus, in such cases from about 0.001 to about 20 molar percent of palladium-platinum triad catalyst, based on the amount of olefin employed, is quite satisfactory. A preferred proportion is within the range from about 0.01 to about 1 molar percent. Two or more catalysts can be employed together for advantageous effects. When the catalyst is not regenerated in situ, however, or serves as the source of halide, molar proportions may be necessary.

At the conclusion of the reaction, the catalyst can be separated by filtration or centrifuging, and the filtrate can then be subjected to fractional distillation, so as to separate any unreacted olefin and any added inert solvent. The reaction product which is the residue can be recovered by distillation, if desired, at reduced pressure, if it be high-boiling.

The reaction is easily adapted to a continuous operation by continuously blending the catalyst, olefin, and any inert solvent, plus unreacted materials from a previous run, which blend is then cycled to a reactor, put under carbon monoxide pressure, and then held there for a dwell time adequate to effect the reaction. If desired, the reactor can be in the form of an elongated tube, the traverse time of which is equal to the reaction time. The reaction mixture is then worked up by separation of the solid catalyst by filtration or centrifuging and distillation of any olefin and inert solvent, if any. The residue is the desired alpha, beta-unsaturated acyl halide.

The following examples in the opinion of the inventors represent preferred embodiments of their invention.

Example 1

In the glass liner of a Parr rocking autoclave was placed 5.46 grams (30.8 millimoles) of palladous chloride and 12.1 grams (90 millimoles) of cupric chloride suspended in 120 ml. of pre-dried acetonitrile. The reactor was closed, and ethylene was added to a pressure of 34 atmospheres. The resulting mixture was shaken for four hours at room temperature so as to form the palladous chloride-ethylene complex. Ethylene pressure was then increased to 44 atmospheres, and carbon monoxide was admitted to a pressure of 62 atmospheres. The mixture then was shaken for sixty-five hours at 28° C. until reaction appeared to be complete. After venting, the system was opened. The reaction mixture was filtered to give a bright yellow precipitate and a clear filtrate. Titration of a portion of this filtrate with aniline and standard sodium hydroxide showed that 63 millimoles of acrylyl chloride was produced (70% yield based on the cupric chloride charged). Acrylyl chloride was identified by vapor phase chromatography. No beta-chloropropionyl chloride was detected in the reaction product, before or after separation of the catalyst.

Example 2

In an apparatus similar to that of Example 1, a suspension of 10.1 millimoles of palladous chloride and 182 millimoles of cupric chloride in 120 ml. of dry acetonitrile was heated at 50° C. for sixty-four hours under a total pressure of 72 atmospheres of ethylene and carbon monoxide. The reaction mixture was filtered, giving a clear filtrate which contained 142 millimoles, a 78% yield, of acrylyl chloride.

Example 3

A pressure reactor similar to that described in Example 1 was charged with 1.78 grams (10 millimoles) of palladous chloride, 24.5 grams (182 millimoles) of cupric chloride, and 120 ml. of benzonitrile. After purging with nitrogen, ethylene was added to a pressure of 34 atmospheres. The mixture was then shaken for 2.5 hours at 21° C. in order to form the palladous chloride-ethylene complex. Then the ethylene pressure was raised to 36.7 atmospheres, and carbon monoxide was added to a total pressure of 52.6 atmospheres. The mixture was heated and rocked at 55° C. for twenty-seven hours. There was recovered after separation of the catalyst 154 millimoles (84%) of a mixture of acrylyl chloride and beta-chloropropionyl chloride, in a ratio of about 5:1, respectively.

Example 4

The glass liner of a rocking autoclave, similar to that of Example 1, was charged with 1.97 grams (11.08 millimoles) of palladous chloride, 24.5 grams (182 millimoles) of cupric chloride, 21.25 grams (0.15 mole) of dried disodium hydrogen phosphate, and 125 ml. of benzene. This mixture was heated under a total pressure of 63 atmospheres (ethylene and carbon monoxide pressure combined) at 65° C. for sixty-five hours. After venting and filtering off the catalyst, it was determined that acrylyl chloride was produced in 15% yield.

Example 5

In a pressure apparatus, similar to that described in Example 1, was added a suspension of 4.8 millimoles of palladous chloride, and 74 millimoles of cupric chloride in 91 ml. of acetic anhydride. This mixture was heated at 70° C. for twenty-seven hours under a total initial pressure of 77 atmospheres of ethylene and carbon monoxide. After venting, the system was opened and the reaction mixture filtered to give a bright yellow precipitate and a clear filtrate. A vapor phase chromatographic analysis of the filtrate identified acrylyl chloride as one of the reaction products.

Example 6

A pressure reactor was charged with the following: 16.6 millimoles of palladous chloride, 20 millimoles of disodium hydrogen phosphate, 18.5 ml. of benzene, and 20 millimoles of styrene. The mixture was shaken at 55° C. for sixteen hours under an initial carbon monoxide pressure of 71 atmospheres. When the reaction was completed, the excess pressure was vented and the catalyst removed by filtration. Ethanol was added to the filtrate to convert the β-phenylacryl chloride or cinnamoyl chloride into its corresponding ester. Ethyl cinnamate was identified by mass spectra and vapor phase chromatographic analyses.

Example 7

The following were added to a pressure reactor similar to that of Example 6, 11.3 millimoles of platinous chloride, 20 millimoles of disodium hydrogen phosphate, 18.5 ml. of benzene and 26 millimoles of styrene. The reactor contents were shaken at 58° C. for seventeen hours under 71 atmospheres of carbon monoxide pressure. The reaction mixture was filtered. The presence of cinnamyol chloride in the filtrate was confirmed by hydrogenating and esterifying this filtrate. Ethyl hydrocinnamate was obtained.

The alpha, beta-unsaturated acid chlorides produced in accordance with the invention are highly reactive materials and in most cases are known compounds. Acrylyl chloride and β-phenylacrylyl chloride are reactive monomers capable of being homo- or copolymerized or used as a cross-linking agent in the cross-linking of various types of linear polymers. A specific and important use of these acyl halides is in the production of the corresponding alpha, beta-unsaturated acids and esters by simple hydrolysis and esterification procedures, all of which are conventional and well known to those skilled in this art and require no further description.

Having regard to the foregoing disclosure, the following is claimed as the inventive and patentable embodiments thereof:

1. A process for the prepartion of alpha-beta-unsaturated acyl halides from olefins, which comprises reacting an olefin having the formula

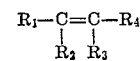

wherein the R radicals are selected from the group consisting of hydrogen and hydrocarbon radicals having from one to about thirty carbon atoms, with carbon monoxide in the presence of a platinum, palladium, ruthenium, rhodium, osmium or iridium catalyst (a halide that does not poison the catalyst), cupric or ferric halides and an acid acceptor, thereby forming the corresponding alpha, beta-unsaturated acyl halide, the amount of acid acceptor being at least equivalent to the molar amount of unsaturated acyl halide produced.

2. A process in accordance with claim 1 in which the reaction is carried out at a temperature within the range from about 20° to about 250° C.

3. A process in accordance with claim 1 in which the reaction is carried out in the presence of an inert organic solvent.

4. A process in accordance with claim 1 in which the carbon monoxide is added under a pressure within the range from about 1 to about 300 atmospheres.

5. A process in accordance with claim 1 in which the olefin is an aliphatic alpha-olefin.

6. A process in accordance with claim 1 in which the olefin is an aromatic alpha-olefin.

7. A process in accordance with claim 1 in which the catalyst is a palladium catalyst.

8. A process in accordance with claim 1 in which the catalyst is a platinum catalyst.

9. A process in accordance with claim 1 in which the acid acceptor is an organic nitrile.

10. A process in accordance with claim 9 in which the acid acceptor is an aliphatic nitrile.

11. A process in accordance with claim 9 in which the acid acceptor is an aromatic nitrile.

12. A process in accordance with claim 1 in which the acid acceptor is an inorganic basic compound.

13. A process in accordance with claim 12 in which the acid acceptor is an inorganic basic salt.

14. A process in accordance with claim 1 in which the acid acceptor is an organic anhydride.

References Cited

UNITED STATES PATENTS

| | | | |
|---|---|---|---|
| 3,221,045 | 11/1965 | McKeon et al. | 260—468 |
| 3,119,861 | 1/1964 | Blackham | 260—544 |
| 2,769,835 | 11/1956 | Kosmin et al. | 260—486 |
| 2,640,073 | 11/1950 | Ney | 260—486 |
| 1,864,884 | 6/1932 | Bauer | 260—486 |

OTHER REFERENCES

Tsuji et al., Tetrahedron Letters No. 16, 1061–1064, 1963.

Tsutsumi et al., Lectures of 16th annual meeting of Chem. Soc. of Japan, p. 458.

LORRAINE A. WEINBERGER, Primary Examiner

E. GLEIMAN, Assistant Examiner